United States Patent
Mang et al.

(10) Patent No.: US 11,873,850 B2
(45) Date of Patent: Jan. 16, 2024

(54) RIVET ELEMENT FOR SETTING A THREAD

(71) Applicant: Bayerische Motoren Werke Aktiengesellschaft, Munich (DE)

(72) Inventors: Martin Mang, Margertshausen (DE); Robert Weinmann, Rammingen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/798,940

(22) PCT Filed: Mar. 1, 2021

(86) PCT No.: PCT/EP2021/055007
§ 371 (c)(1),
(2) Date: Aug. 11, 2022

(87) PCT Pub. No.: WO2021/213713
PCT Pub. Date: Oct. 28, 2021

(65) Prior Publication Data
US 2023/0340982 A1    Oct. 26, 2023

(30) Foreign Application Priority Data
Apr. 22, 2020 (DE) .................... 10 2020 110 872.9

(51) Int. Cl.
F16B 13/06 (2006.01)
F16B 19/10 (2006.01)
F16B 37/06 (2006.01)

(52) U.S. Cl.
CPC ........ *F16B 19/1072* (2013.01); *F16B 13/061* (2013.01); *F16B 37/067* (2013.01)

(58) Field of Classification Search
CPC .................................................. F16B 13/061
See application file for complete search history.

(56) References Cited

U.S. PATENT DOCUMENTS

| 2,343,143 A | 2/1944 | Gill |
| 5,066,446 A | 11/1991 | Phillips, II |
| | (Continued) | |

FOREIGN PATENT DOCUMENTS

| DE | 20 2015 100 359 U1 | 5/2015 |
| EP | 1 500 829 B1 | 7/2006 |
| | (Continued) | |

OTHER PUBLICATIONS

English Machine Translation of EP3462045(A1), Hanratty, Paul. (Year: 2019).*

(Continued)

*Primary Examiner* — Sarang Afzali
(74) *Attorney, Agent, or Firm* — Crowell & Moring LLP

(57) ABSTRACT

A rivet element for setting a thread into at least one component has a head portion which can be interlockingly brought into abutment with the component and a sleeve portion which can be inserted into an opening extending through the component and can be plastically deformed. The sleeve portion is provided with an internal thread into which a traction mandrel and/or a screw element can be screwed. The sleeve portion has a protruding rib structure on the outer circumference, the rib structure having at least one first support rib and at least one second support rib which extend in the longitudinal direction of the sleeve portion and are separated from one another by a recess. After the plastic deformation of the sleeve portion, the support ribs contact one another in order to allow a direct force flow between the head portion and the sleeve portion.

7 Claims, 2 Drawing Sheets

(56) References Cited

U.S. PATENT DOCUMENTS

| | | | | |
|---|---|---|---|---|
| 5,690,454 | A | * 11/1997 | Smith | ............... F16B 13/061 411/908 |
| 6,761,520 | B1 | * 7/2004 | Dise | .................. F16B 37/067 411/113 |
| 2005/0019129 | A1 | 1/2005 | Hesse et al. | |

FOREIGN PATENT DOCUMENTS

| | | | |
|---|---|---|---|
| EP | 3 462 045 A1 | 4/2019 | |
| GB | 2185081 A * | 7/1987 | ............ F16B 13/061 |
| GB | 2 353 834 A | 3/2001 | |
| WO | WO-9005855 A1 * | 5/1990 | ............ F16B 13/061 |

OTHER PUBLICATIONS

International Search Report (PCT/ISA/210) issued in PCT Application No. PCT/EP2021/055007 dated Jun. 1, 2021 with English translation (four (4) pages).

German-language Written Opinion (PCT/ISA/237) issued in PCT Application No. PCT/EP2021/055007 dated Jun. 1, 2021 (five (5) pages).

German-language Search Report issued in German Application No. 10 2020 110 872.9 dated Dec. 9, 2020 with partial English translation (12 pages).

* cited by examiner

RIVET ELEMENT FOR SETTING A THREAD

BACKGROUND AND SUMMARY

The invention relates to a rivet element for setting a thread into at least one component, which rivet element has a head portion, which can be brought to rest in a form-fitting manner on the component, and a sleeve portion, which can be inserted into an opening extending through the component and is plastically deformable, wherein the sleeve portion is provided with an internal thread into which a traction mandrel and/or a screw element can be screwed.

A rivet element of the type mentioned at the beginning is used to introduce a load-bearing thread into a thin-walled component, for example a sheet-metal part. The thin-walled component can then be screwed to another component via the thread.

In the case of components which are accessible from only one side, a so-called blind rivet nut is conventionally used. A blind rivet nut has an elongate, hollow sleeve portion having an internally threaded portion, which is plastically deformable, and a head portion.

For setting a blind rivet nut, an opening is produced in the component and the rivet element is then inserted into the opening. After the rivet element has been inserted into the opening, the head portion rests on the component and a portion of the sleeve portion extends out of the opening. For the plastic deformation of the sleeve portion, a so-called traction mandrel, which extends through the rivet body and protrudes from the sleeve portion at the head portion, is screwed in. By application of a traction force to the traction mandrel, the sleeve portion is compressed and thereby forms a circumferential bead, which rests on the opposite side of the component to the head portion. The blind rivet nut is thereby fixed in a form-fitting manner to the component. After the plastic deformation of the sleeve portion, the traction mandrel can be unscrewed again.

DE 20 2015 100 359 U1 discloses a blind rivet nut which has a setting head and a hollow shank, wherein the hollow shank comprises an anti-twist portion, which is adjacent to the setting head and has a polygonal outer shape, a threaded portion for receiving a threaded element, and a clamping portion situated between the anti-twist portion and the threaded portion, wherein the clamping portion is intended to be deformed during an operation of setting the blind rivet nut on a carrier, and wherein the clamping portion comprises a series of longitudinal slots, which extend along a longitudinal axis of the hollow shank, a first part adjacent to the anti-twist portion, and a second part situated between the first part and the threaded portion, wherein the longitudinal slots are located only in the second part.

With the increasing use of blind rivet nuts in the region of the chassis, there is an increased need to achieve overelastic screw tightening in the two components to be connected in order to transmit high shear forces that occur.

The object underlying the present invention is to provide a rivet element which permits overelastic screw tightening.

In order to achieve the object, a rivet element having the features of the independent claim is proposed.

Advantageous embodiments of the rivet element are subject-matter of the dependent claims.

According to one aspect, a rivet element for setting a thread into at least one component is proposed. The rivet element has a head portion, which can be brought to rest in a form-fitting manner on the component, and a sleeve portion, which can be inserted into an opening extending through the component and is plastically deformable, wherein the sleeve portion is provided with an internal thread into which a traction mandrel and/or a screw element can be screwed, wherein the sleeve portion has a protruding rib structure on the outer circumference, and wherein the rib structure has at least a first support rib and at least a second support rib which extend in the longitudinal direction of the sleeve portion and are separated from one another by a recess, and wherein, after the plastic deformation of the sleeve portion, the support ribs are in contact with one another in order to permit a direct force flow between the head portion and the sleeve portion.

The two support ribs are moved towards one another during the plastic deformation of the sleeve portion, that is to say during the riveting process, until they are in contact with one another. Because the support ribs are separated from one another by a recess, no bead forms between the support ribs during the riveting process. When the riveting process is complete, a direct force flow between the head portion and the sleeve portion is made possible when a fastening element is screwed into the internal thread in that the force that occurs during screwing in is transmitted via the support ribs. The rib structure thus ensures that, in the case of overelastic screw tightening, reseating, that is to say further deformation of the rivet element, owing to the high pretension force is avoided. A defined pretension force can thereby be achieved. In addition, the occurrence of high scatter in the screwing process curves owing to rotation angle variations caused by the resetting process is avoided. Moreover, the deformation process of the rivet element is terminated not as hitherto purely by a force cut-off but by a geometrically defined feature. Finally, the rib structure provides further form-fitting protection against twisting of the rivet element in the carrier material.

By screwing in a fastening element, for example a screw, the component can be connected to another component by means of screw tightening, in particular by means of overelastic screw tightening. Furthermore, the internal thread can also be used to connect a traction mandrel to the rivet element. For this purpose, the traction mandrel can have at its end an external thread which is screwed into the internal thread of the sleeve portion protruding from the head portion. By application of a traction force to the traction mandrel, the sleeve portion is compressed and plastically deformed. On completion of the riveting process, the traction mandrel can be unscrewed from the internal thread and used for a further riveting process.

In an advantageous embodiment, the first support rib rests directly on the head portion and the second support rib is arranged at the free end of the sleeve portion. The second support rib is preferably longer than the first support rib.

The rivet element can be used for implementing shear panel and strut connections in the region of the chassis.

By means of the recess, the formation of a curvature of the sleeve portion during the plastic deformation of the sleeve portion is avoided, in order to make it possible to produce a direct force flow from the head portion to the sleeve portion.

In an advantageous embodiment, the support ribs are in direct contact with one another after the plastic deformation. Further advantageously, the mutually facing end faces of the support ribs are in contact with one another.

In an advantageous embodiment, the sleeve portion is slotted in the region of the recess. The slot between the two support ribs has the effect that, on plastic deformation of the sleeve portion, there is no bead portion in the form of a convexity between the support ribs. Direct contact between the two support ribs after plastic deformation and thus a direct force flow from the head portion to the sleeve portion can thereby be established.

In an advantageous embodiment, the rib structure has a plurality of rib pairs arranged distributed in the circumferential direction of the sleeve portion, wherein each rib pair has a first support rib and a second support rib which extend in the longitudinal direction of the sleeve portion and which are separated from one another by a recess. By the arrangement of the rib pairs on the circumference of the sleeve portion, a uniform distribution of the direct force flow between the head portion and the sleeve portion is ensured. Advantageously, the rib pairs are arranged distributed on the circumference of the sleeve portion at equidistant intervals from one another. The rib pairs can also be arranged distributed on the circumference of the sleeve portion at irregular intervals from one another.

In an advantageous embodiment, the support ribs are cuboidal. An optimal force flow between the head portion and the sleeve portion is thereby created. In addition, cuboidal support ribs are simple and inexpensive to produce. Finally, the geometry provides further form-fitting protection against twisting of the rivet element in the carrier material.

In an advantageous embodiment, the support ribs are formed integrally with and from the same material as the sleeve portion. An improved direct force flow between the head portion and the sleeve portion is thereby created. In addition, the rib pairs can be produced in a simple manner during production of the rivet element. The rivet element can be produced by deep-drawing.

In an advantageous embodiment, the sleeve portion, after the plastic deformation, has at least one bead portion which is adjacent to the rib structure. During the plastic deformation of the sleeve portion, that is to say during the riveting process, the sleeve portion is compressed. The sleeve portion thereby forms material distortions in the form of a bead portion. The bead portions rest on the opposite side of the component to the head portion and ensure that the rivet element is seated in a form-fitting manner in the opening. The bead portion can also be referred to as a convexity. When the rivet element has a plurality of rib pairs, the sleeve portion has a bead portion between in each case two rib pairs.

In an advantageous embodiment, the rivet element is made of metal and/or plastics material. A rivet element produced from metal has high strength. A rivet element produced from plastics material, in particular fiber-reinforced plastics material, has a low weight.

A method for producing an overelastic screw connection between at least two components by means of a rivet element can comprise the following method steps. First of all, an opening extending through a component is produced, wherein the opening has a circular portion and at least one rectangular portion. The rivet element is subsequently inserted into the opening such that a sleeve portion of the rivet element is arranged within the circular portion and a rib structure of the rivet element is arranged within the rectangular portion. A traction mandrel is then screwed into an internal thread of the rivet element. The rivet element is subsequently plastically deformed by application of a traction force to the traction mandrel, so that support ribs of the rib structure come into contact with one another and the sleeve portion forms bead portions. When the plastic deformation is complete, the traction mandrel is unscrewed from the internal thread. Finally, a second component is positioned with an opening in front of the rivet element and a screw element is passed through the opening and screwed into the internal thread of the rivet element and tightened overelastically.

A rivet element and further features and advantages will be explained in greater detail hereinbelow by means of an exemplary embodiment which is shown diagrammatically in the figures.

BRIEF DESCRIPTION OF THE DRAWINGS

FIGS. 1 to 4 show a rivet element 10 for setting a thread into a component (not shown).

DETAILED DESCRIPTION OF THE DRAWINGS

Figure 1:
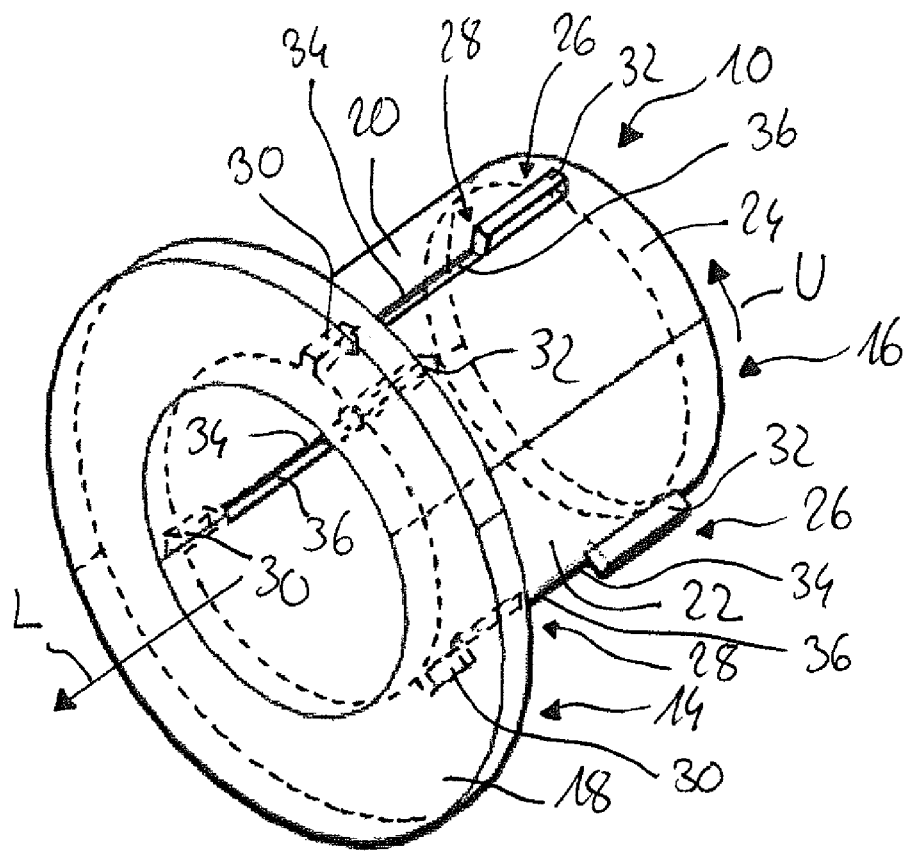
FIG. 1 is a perspective view of a rivet element.

The rivet element 10 is made of metal and/or plastics material and has a head portion 14, which can be brought to rest in a form-fitting manner on the component, and a sleeve portion 16, which can be inserted into an opening extending through the component.

The head portion 14 has a cylindrical flange 18, which rests in a form-fitting manner on the component when the sleeve portion 16 is inserted into an opening extending through the component.

The sleeve portion 16 is plastically deformable and is in the form of a hollow cylinder 20 with an internal thread 22. A traction mandrel (not shown), for plastically deforming the sleeve portion 16, and a screw element (not shown) can be screwed into the internal thread 22.

As can be seen from an overview of FIGS. 1 to 4, the sleeve portion 16 has a rib structure 26 on its outer circumference 24. The rib structure 26 is formed of a plurality of rib pairs 28 arranged distributed in the circumferential direction U of the sleeve portion, wherein each rib pair 28 has a first support rib 30 and a second support rib 32 which extend in the longitudinal direction L of the sleeve portion 16.

The support ribs 30, 32 are separated from one another by a recess 34, wherein the recess 34 is in the form of a slot 36 introduced into the sleeve portion 16.

Figure 2:
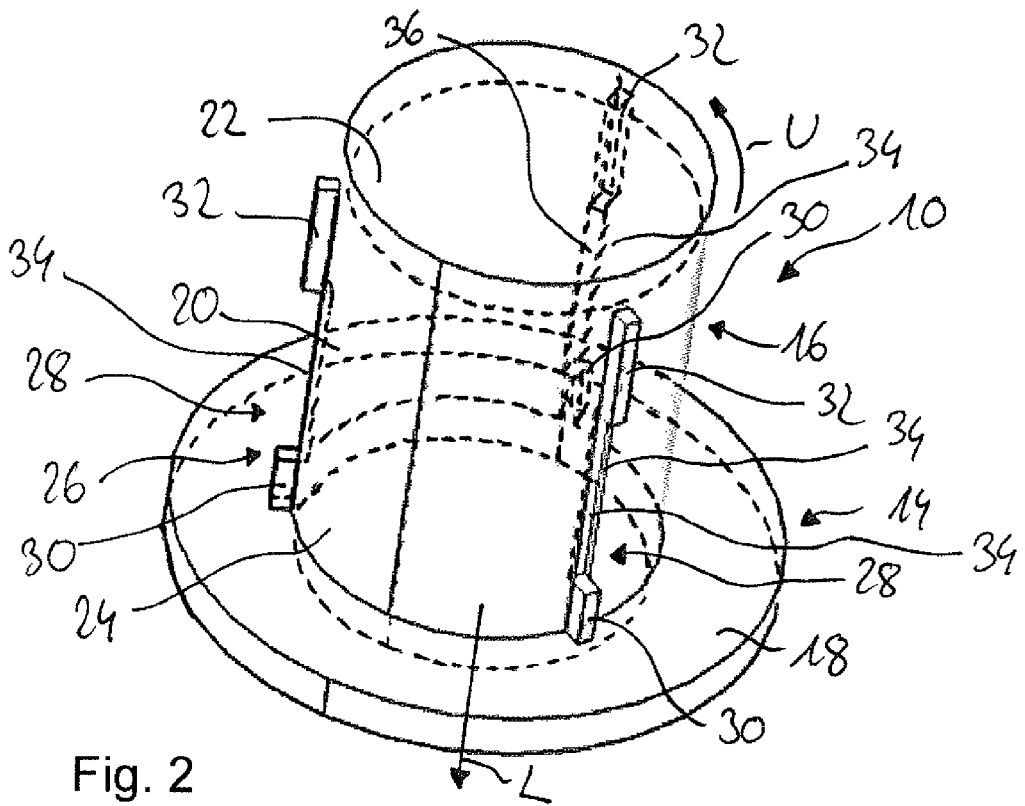
FIG. 2 is a second perspective view of the rivet element of FIG. 1.
Figure 3:
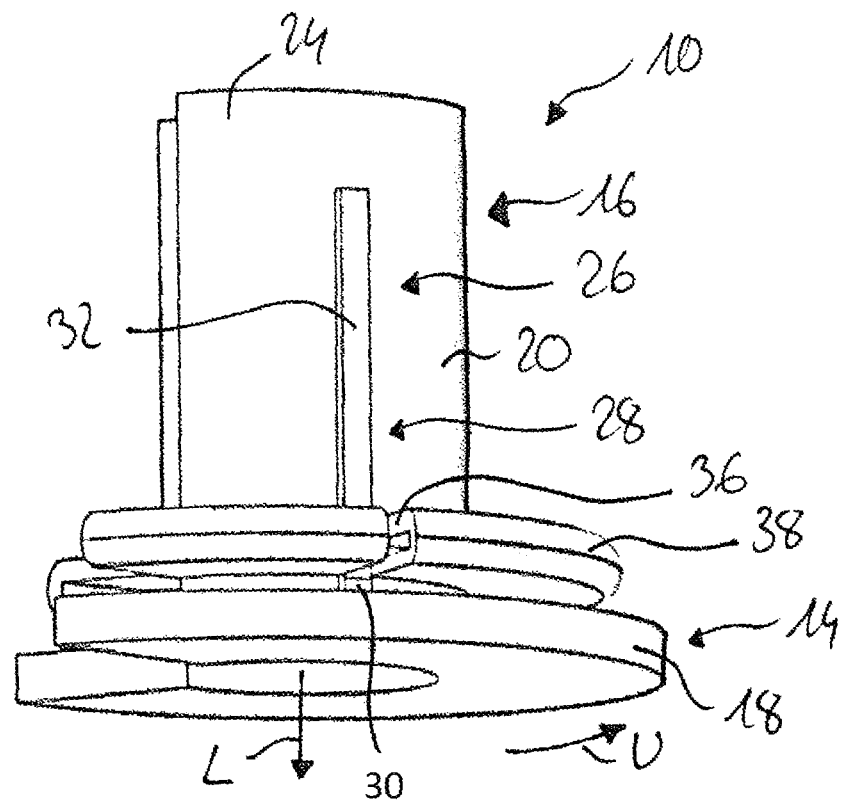
FIG. 3 is a plan view of the rivet element in the plastically deformed state with a cut-out.
Figure 4:
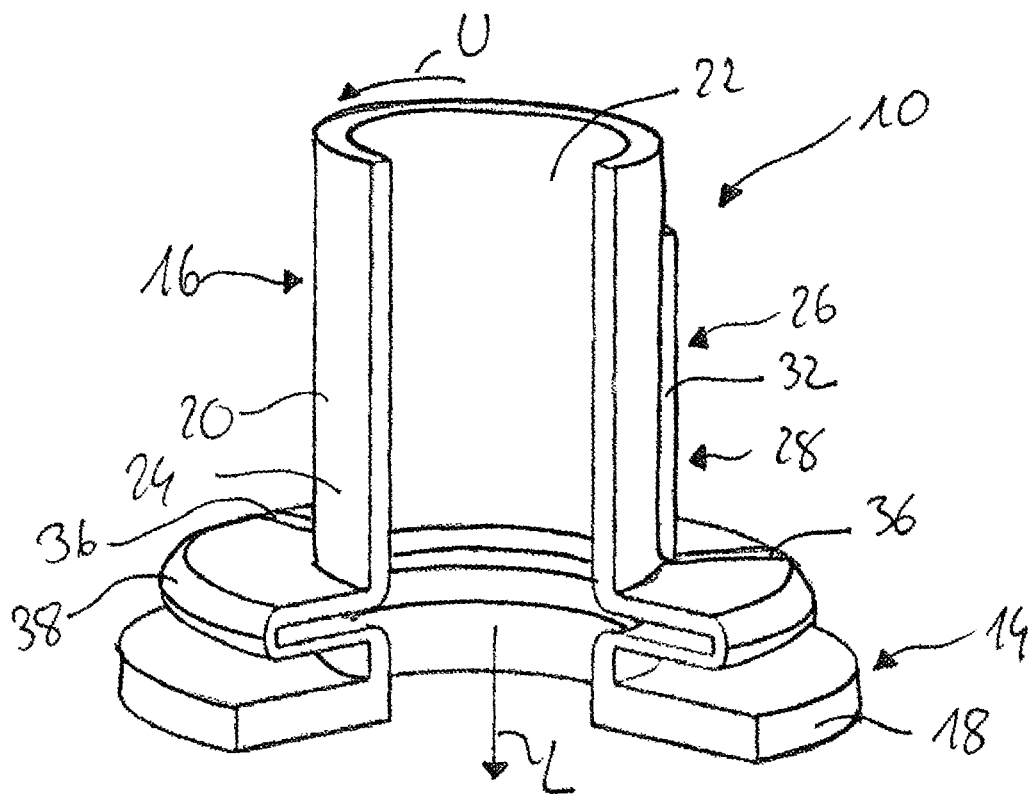
FIG. 4 is a view rotated through 90° of the rivet element of FIG. 3.

As can be seen in particular in FIGS. 1 and 2, the first support rib 30 rests directly on the head portion 14, while the second support rib 32 is arranged at the free end of the sleeve portion 16. In the present case, the second support rib 32 is longer than the first support rib 30. In the plastically deformed state of the sleeve portion 16, as is shown in FIGS. 3 and 4, the two support ribs 30, 32 abut one another directly, so that a direct force flow between the head portion 14 and the sleeve portion 16 is made possible when a screw element (not shown) is screwed in.

In the plastically deformed state of the sleeve portion 16, bead portions 38, which result from the compression of the sleeve portion 16 during plastic deformation, form between the support ribs 30, 32 in contact with one another. The bead portions 38 thereby form convexities.

In the following text, a possible method for connecting two components by means of the rivet element 10 and overelastic screw tightening will be explained. First of all, there is produced in one of the components an opening extending through the component, wherein the opening has a circular portion and rectangular portions. The rivet element 10 is then inserted into the opening such that the sleeve portion 16 is arranged within the circular portion and the rib structure 26 is arranged within the rectangular portion, and the head portion 14 rests on the component. A traction mandrel (not shown) is then screwed into the internal thread 22, and a traction force is applied to the traction mandrel. The sleeve portion 16 thereby deforms plastically in that the sleeve portion is compressed, so that the second support rib 32 moves towards the first support rib 30 and the bead portions 38 form between the rib pairs. When the plastic deformation of the sleeve portion 16 is complete, the two support ribs 30, 32 abut one another. The traction mandrel is then unscrewed from the internal thread 22 and a second component is positioned with an opening over the rivet element such that a screw element (not shown) is inserted into the opening and screwed into the internal thread 22 and tightened overelastically.

The provision of support ribs 30, 32, separated by a slot 36, on the outer circumference 24 of the sleeve portion 16 permits a direct force flow between the head portion 14 and the sleeve portion 16 when the riveting process is complete, when a screw element is screwed into the internal thread 22. As a result of the direct force flow from the head portion 14 to the sleeve portion 16, resetting phenomena due to a high pretension as a result of overelastic screw tightening are ruled out. A defined pretension force is thereby achieved, which can ensure the functional demands on overelastic screw tightening. Moreover, high scatter in the screwing process curves owing to rotation angle variations caused by the resetting process does not occur. In addition, the combination of the opening having a rectangular portion and the rib structure 26 arranged therein provides form-fitting protection against twisting of the rivet element 10 in the carrier material during screwing and overelastic tightening.

LIST OF REFERENCE SIGNS

10 rivet element
14 head portion
16 sleeve portion
18 cylindrical flange
20 hollow cylinder
22 internal thread
24 outer circumference
26 rib structure
28 rib pair
30 first support rib
32 second support rib
34 recess
36 slot
38 bead portion
U circumferential direction
L longitudinal direction

The invention claimed is:

1. A rivet element for setting a thread into at least one component, the rivet element comprising:
    a head portion configured so as to be brought to rest in a form-fitting manner on the component when used; and
    a sleeve portion which is insertable in use into an opening extending through the component and 1 s plastically deformable, wherein
    the sleeve portion has an internal thread into which a traction mandrel and/or a screw element is screwable,
    the sleeve portion has a protruding rib structure on an outer circumference,
    the rib structure has at least a first support rib and at least a second support rib which extend coaxially in a longitudinal direction of the sleeve portion and which are separated from one another by a recess in the sleeve portion, such that, after plastic deformation of the sleeve portion when used, the first and second support ribs contact one another in order to permit a direct force flow between the head portion and the sleeve portion.

2. The rivet element according to claim 1, wherein the recess is a slot in the sleeve portion.

3. The rivet element according to claim 1, wherein the rib structure has a plurality of rib pairs arranged distributed in the circumferential direction of the sleeve portion,
    each rib pair has the first support rib and the second support rib which extend in the longitudinal direction of the sleeve portion and which are separated from one another by the recess.

4. The rivet element according to claim 1, wherein the support ribs are cuboidal.

5. The rivet element according to claim 1, wherein the support ribs are formed integrally with and from the same material as the sleeve portion.

6. The rivet element according to claim 1, wherein after the plastic deformation, the sleeve portion has at least one bead portion which is adjacent to the rib structure.

7. The rivet element according to claim 1, wherein the rivet element is made of metal and/or plastics material.

* * * * *